Jan. 15, 1935.  A. J. GILLES  1,988,379
CUTTING IMPLEMENT
Filed May 3, 1934  2 Sheets-Sheet 1
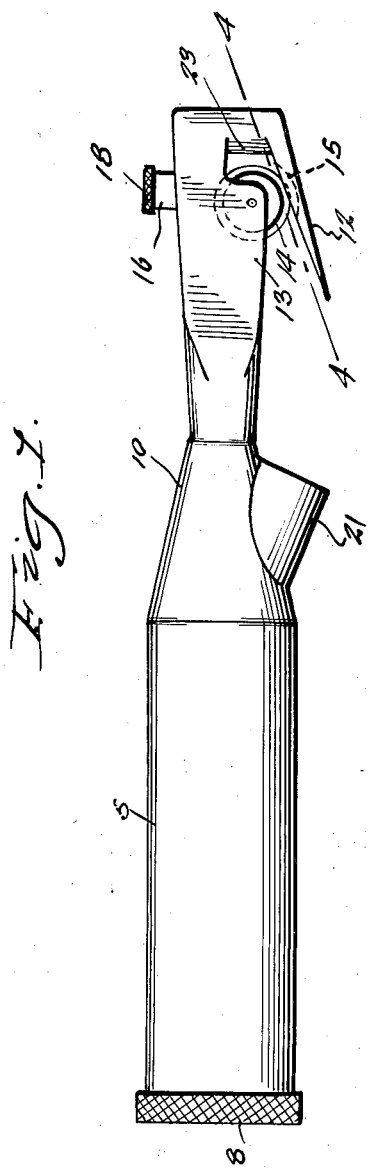
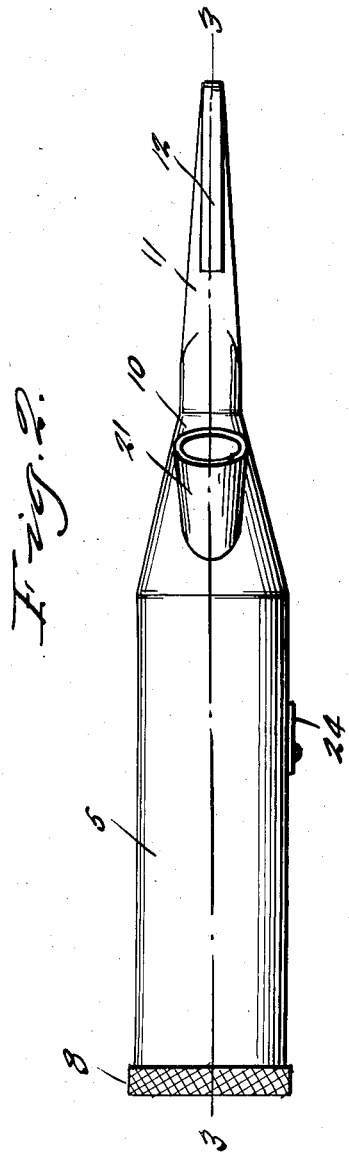
Inventor
Aloysius J. Gilles
By Clarence A. O'Brien
Attorney Jan. 15, 1935.  A. J. GILLES  1,988,379
CUTTING IMPLEMENT
Filed May 3, 1934   2 Sheets-Sheet 2
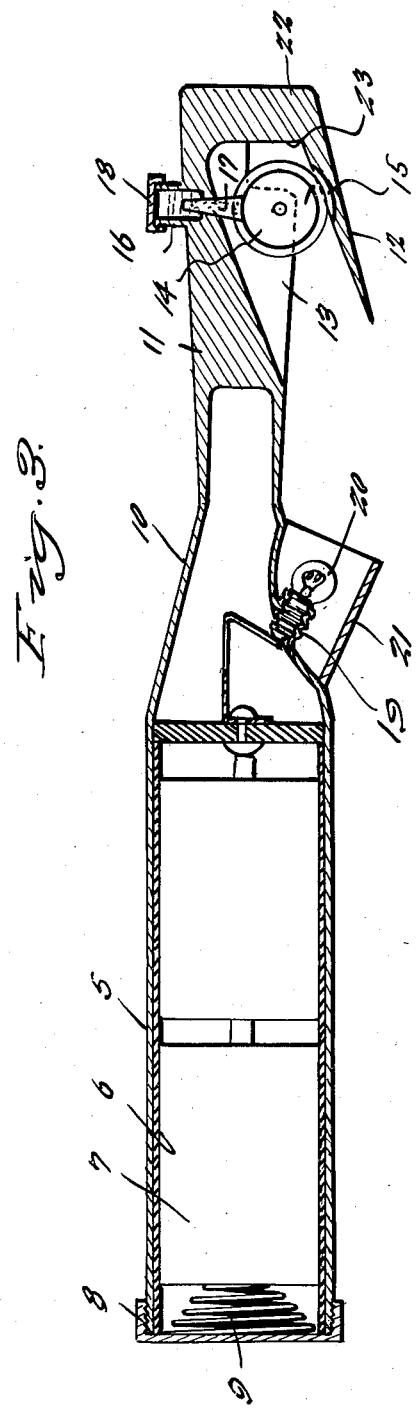
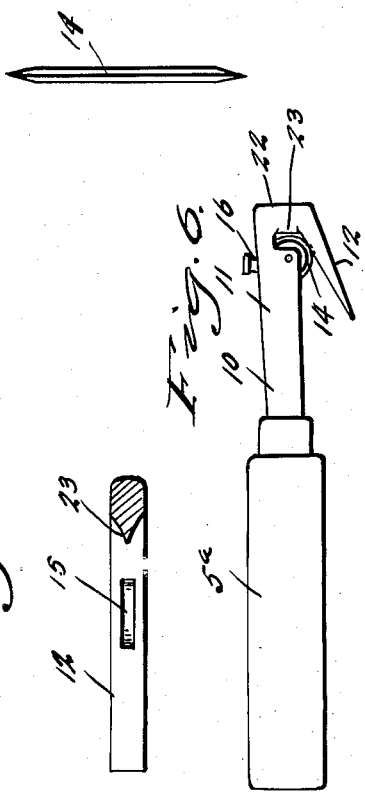
Inventor
Aloysius J. Gilles
By Clarence A. O'Brien
Attorney Patented Jan. 15, 1935

1,988,379

UNITED STATES PATENT OFFICE 1,988,379

CUTTING IMPLEMENT

Aloysius J. Gilles, Evansville, Ind.

Application May 3, 1934, Serial No. 723,776

3 Claims. (Cl. 164—84)

This invention appertains to new and useful improvements in cutting implements, and more particularly to a hand implement whereby sheet material can be cut accurately and conveniently.

The principal object of the present invention is to provide a cutting implement having self-contained illuminating means whereby the cutting blade will be illuminated, as well as the immediate vicinity of the work being operated on.

Another important object of the present invention is to provide a hand cutting implement which will be efficient for cutting linoleum and other semi-stiff sheets in dark and inaccessible places.

These and numerous other important objects and advantages of the invention will become apparent to the reader of the following specification.

In the drawings:

Figure 1 represents a side elevational view of the implement.

Figure 2 represents a bottom plan view of the implement.

Figure 3 represents a longitudinal sectional view taken substantially on line 3—3 of Figure 2.

Figure 4 represents a sectional view taken substantially on line 4—4 of Figure 1.

Figure 5 represents an edge elevational view of the cutter disk.

Figure 6 represents a side elevational view of the implement without the illuminating means.

Referring to the drawings wherein like numerals designate like parts, it can be seen that the instrument consists of a hollow handle 5 provided with a di-electric lining 6 within which are contained the batteries 7. The butt end of the handle 5 is provided with a removable cap 8 and a spring 9 is interposed between the adjacent battery cell and the cap in the usual manner found conventional in present-day flashlights. Numeral 10 represents an elongated hollow neck extending from the forward end of the handle 5 and terminating in a solid head structure 11 which is provided with a backwardly disposed guide claw 12. A pair of side flanges 13 depends from the head structure 11 toward the claw 12 and between these is rotatably mounted the cutter disk 14 which partly projects at its periphery into an arcuate-shaped grooveway 15 in the top side of the claw 12. A well 16 is provided at the top of the head 11 and through an opening in the bottom of this well a brush 17 extends to wipe against the periphery or cutting edge of the disk 14. This well 16 is provided with a cap 18 and is to carry a supply of oil which lubricates the brush 17 by capillary attraction, the brush in turn always keeping the blade 14 oiled and free from gum and like matter acquired from the linoleum or other sheet material being cut.

The bottom side of the neck portion 10 is provided with a lamp socket 19 for receiving a bulb 20 and the bulb and lamp are located within a shield 21. The lamp 20 is so positioned as to throw light on to the guide claw 12 and immediately in advance thereof so that a portion of the work will be illuminated. The portion 22 which connects the claw 12 to the head 11 is provided with a sharp edge portion 23 on its inner side so as to cut the linoleum entirely through in the event any webs or connecting parts are left after cutting action by the disk 14.

A switch 24 is provided on the side of the handle 5 whereby the lamp 20 can be supplied with energy from the battery 7.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A cutting implement of the character described comprising a handle, a head on the handle provided with an integral backwardly disposed guide claw, a rotary cutting disk mounted between the claw and the said head, said claw being provided with an arcuate-shaped groove therein for partly receiving the peripheral portion of the disk, said head enclosing the upper and forward portions of said disk.

2. A cutting implement of the character described comprising a tubular handle, adapted for receiving dry cell batteries, a head on the handle provided with an integral backwardly disposed claw, a rotary cutting disk mounted between the claw and the said head, said head enclosing the upper and forward portions of said disk, and means on the handle for directing a light beam on the cutting position of said disk.

3. A hand linoleum cutting implement comprising a tubular handle forming a chamber to receive a dry cell electric battery, an illuminating means formed on a portion of the wall of the handle including a light socket and a reflector surrounding the socket, a solid head on the handle formed with a pocket adjacent the end of the head, a rotary disk cutter journaled in the head and having the major portion thereof confined within the pocket, a rearwardly directed claw below the cutting disk formed with a recess in alignment with the periphery thereof, said recess confining a portion of the periphery of the cutting disk, said disk and claw in substantial alignment with the reflector so that light will fall in line with the cutting operation, said solid head formed with a covered oil well, a conductor means in the well and in wiping contact with the cutter disk, and the portion of the head forwardly of the pocket formed with a point to separate the cut edges of the material being cut.

ALOYSIUS J. GILLES.